United States Patent [19]
Engelberth et al.

[11] Patent Number: 6,101,301
[45] Date of Patent: Aug. 8, 2000

[54] TEMPERATURE-COMPENSATED OPTICAL FIBER GRATINGS WITH FINE WAVELENGTH TUNING

[75] Inventors: Jon W. Engelberth, Denville; Rolando Patricio Espindola, New Providence; Sungho Jin, Millington; Paul Joseph Lemaire, Madison; Hareesh Mavoori, Berkeley Heights, all of N.J.

[73] Assignee: Lucent Technologies Inc., Murray Hill, N.J.

[21] Appl. No.: 09/062,339

[22] Filed: Apr. 17, 1998

[51] Int. Cl.[7] ........................................... G02B 6/34
[52] U.S. Cl. ................................................ 385/37
[58] Field of Search .................. 385/37, 41–42, 385/137, 147; 372/92, 20, 96, 102; 359/333, 344, 349, 121, 125, 127, 136, 573

[56] References Cited

U.S. PATENT DOCUMENTS

| | | | |
|---|---|---|---|
| 5,510,920 | 4/1996 | Ota | 359/121 |
| 5,666,224 | 9/1997 | Wood et al. | 359/573 |
| 5,694,503 | 12/1997 | Fleming et al. | 385/37 |
| 5,773,345 | 6/1998 | Ota | 438/286 |

*Primary Examiner*—Akm E. Ullah

[57] ABSTRACT

A temperature compensated optical fiber grating device comprises a longitudinally extending optical fiber grating having a length and a packaging assembly for the grating comprising a first longitudinally extending body of material having a first coefficient of thermal expansion (CTE) and second and third longitudinally extending bodies of material having CTE's lower than the first CTE. The three bodies are mechanically attached at alternate ends to form a composite structure having an effective negative CTE between two ends to which the grating is attached. The resulting grating device can be made in compact form having an overall length less than 30% more than the grating (and preferably less than 10%) and can reduce the temperature dependent wavelength change in the grating to less than 0.2 nm/100° C. and preferably less than 0.05 nm/100° C. In a preferred embodiment, the packaging bodies include a cylinder enclosing the grating.

16 Claims, 5 Drawing Sheets

TEMPERATURE-COMPENSATED OPTICAL FIBER GRATINGS WITH FINE WAVELENGTH TUNING

FIELD OF THE INVENTION

The present invention relates to optical fiber gratings, in particular, dimensionally compact and wavelength-adjustable gratings that are packaged such that the grating reflection wavelength is substantially temperature independent.

BACKGROUND OF THE INVENTION

Optical fibers are key components in modern telecommunication systems. Basically, optical fibers are thin strands of glass capable of transmitting an optical signal containing a large amount of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction. Optical fiber gratings are important elements for selectively controlling specific wavelengths of light within an optical fiber. Such gratings include Bragg gratings and long period gratings.

A typical Bragg grating comprises a length of optical fiber including a plurality of perturbations in the index of refraction substantially equally spaced along the fiber length. These perturbations selectively reflect light of wavelength $\lambda$ equal to twice the spacing $\Lambda$ between successive perturbations times the effective refractive index, i.e. $\lambda = 2n_{eff}\Lambda$, where $\lambda$ is the vacuum wavelength and $n_{eff}$ is the effective refractive index of the propagating mode. The remaining wavelengths pass essentially unimpeded. Such Bragg gratings have found use in a variety of applications including filtering, stabilization of semiconductor lasers, reflection of fiber amplifier pump energy, and compensation for fiber dispersion.

Long-period fiber grating devices provide wavelength dependent loss and may be used for spectral shaping. A long-period grating couples optical power between two copropagating modes with very low back reflections. A long-period grating typically comprises a length of optical fiber wherein a plurality of refractive index perturbations are spaced along the fiber by a periodic distance $\Lambda'$ which is large compared to the wavelength $\lambda$ of the transmitted light. In contrast with conventional Bragg gratings, long-period gratings use a periodic spacing $\Lambda'$ which is typically at least 10 times larger than the transmitted wavelength, i.e. $\Lambda' \geq 10\lambda$. Typically $\Lambda'$ is in the range 15–1500 micrometers, and the width of a perturbation is in the range $1/5\ \Lambda'$ to $4/5\ \Lambda'$. In some applications, such as chirped gratings, the spacing $\Lambda'$ can vary along the length of the grating.

Long-period fiber grating devices selectively remove light at specific wavelengths by mode conversion. In contrast with conventional Bragg gratings in which light is reflected and stays in the fiber core, long-period gratings remove light without reflection as by converting it from a guided mode to a non-guided mode. A non-guided mode is a mode which is not confined to the core, but rather, is defined by the entire waveguide structure. Often, it is a cladding mode. The spacing $\Lambda'$ of the perturbations is chosen to shift transmitted light in the region of a selected peak wavelength $\lambda_p$ from a guided mode into a nonguided mode, thereby reducing in intensity a band of light centered about the peak wavelength $\lambda_p$. Alternatively, the spacing $\Lambda'$ can be chosen to shift light from one guided mode to a second guided mode (typically a higher order mode), which is subsequently stripped off the fiber to provide a wavelength dependent loss. Such devices are particularly useful for equalizing amplifier gain at different wavelengths of an optical communication system.

In the Bragg gratings, both $n_{eff}$ and $\Lambda$ are temperature dependent, with the net temperature dependence for a grating in silica-based fiber exemplarily being about +0.0115 nm/° C. for $\lambda$=1550 nm. The temperature-induced shift in the reflection wavelength typically is primarily due to the change in $n_{eff}$ with temperature. The thermal expansion-induced change in $\Lambda$ is responsible for only a small fraction of the net temperature dependence of a grating in a conventional $SiO_2$-based fiber.

In many applications of fiber Bragg gratings it would be highly desirable if the reflection wavelength were relatively temperature-independent. U.S. patent application Ser. No. 08/539,473, filed Oct. 4, 1995 by D. J. DiGiovanni et al. discloses relatively temperature insensitive long period fiber gratings. The temperature insensitivity is attained by appropriate selection of cladding composition in a fiber with multilayer cladding. See also the co-pending, co-assigned patent application Ser. No. 08/716,658 entitled "Long-Period Fiber Grating Devices Packaged for Temperature Stability" and filed on Jul. 6, 1996 by J. B. Judkins et al.

U.S. Pat. No. 5,042,898 discloses apparatus that can provide temperature compensation of a fiber Bragg grating. The apparatus comprises two juxtaposed compensating members that differ with respect to the coefficient of thermal expansion (CTE). Both members have a conventional positive CTE. The fiber is rigidly attached to each of the members, with the grating disposed between two attachment points. The apparatus can be designed to apply tensile or compressive stress to the grating. In the latter case the grating is confined in a small tube, exemplarily a silica tube.

The prior art designs are typically considerably longer than the grating, e.g. at least 40% longer than the grating device, thus making the temperature compensated package undesirably large. In addition, temperature compensating packages can have a substantial variation of reflection wavelength from one package to another because of the variability in the grating periodicity as well as minute variations in the degree of pre-stress applied to each grating or minute variations in the attachment locations.

Accordingly, there is a need for compact packaging design for temperature compensating fiber grating devices. There is also a need for such a design with simple and easy fine adjustment of the grating wavelength.

SUMMARY OF THE INVENTION

In accordance with the invention, a temperature compensated optical fiber grating device comprises a longitudinally extending optical fiber grating having a length and a packaging assembly for the grating comprising a first longitudinally extending body of material having a first coefficient of thermal expansion (CTE) and second and third longitudinally extending bodies of material having CTE's lower than the first CTE. The three bodies are mechanically attached at alternate ends to form a composite structure having an effective negative CTE between two ends to which the grating is attached. The resulting grating device can be made in compact form having an overall length less than 30% more than the grating (and preferably less than 10%) and can reduce the temperature dependent wavelength change in the grating to less than 0.2 nm/100° C. and preferably less than 0.05 nm/100° C. In a preferred embodiment, the packaging bodies include a cylinder enclosing the grating.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale. The same reference numerals are used to designate similar elements throughout the drawings.

DETAILED DESCRIPTION

Figure 1:
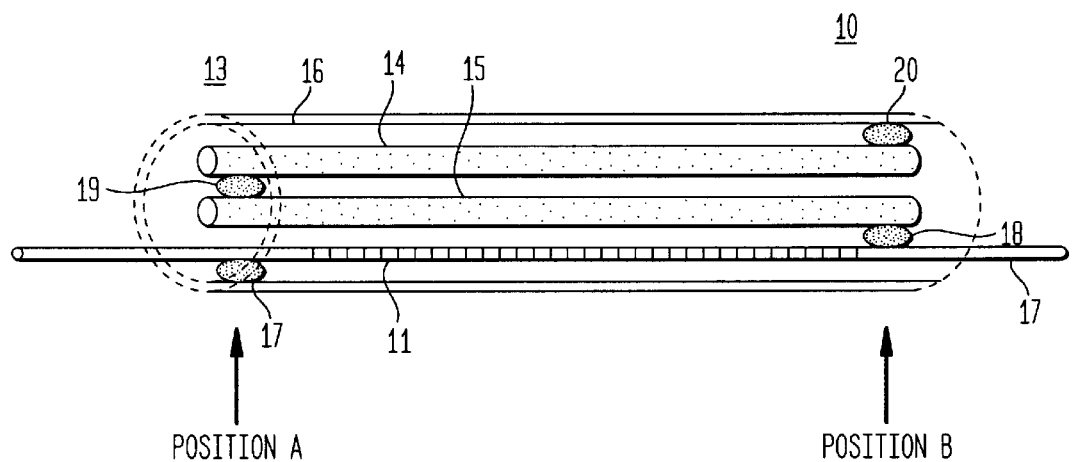
FIG. 1 schematically illustrates a first embodiment of a fiber grating in a temperature compensating package.

Referring to the drawings, FIG. 1 schematically illustrates an exemplary passive temperature-compensating fiber grating device 10 comprising a fiber grating 11 of length Lg formed in a longitudinally extending optical fiber 12 of material having a coefficient of thermal expansion (CTE) of $\alpha_g$. The grating 11 is disposed in a packaging assembly 13 comprising three longitudinally extending bodies (such as rods, strips, cylinders or channels): a first longitudinally extending body 14 of a material having a relatively high CTE ($\alpha_1$) and a length $L_1$. The remaining two package bodies 15, 16 are longitudinally extending bodies having CTEs lower than $\alpha_1$. One of the low CTE bodies 15 can have a CTE of $\alpha_2$ and a length $L_2$. The third body is preferably a hollow tube 16 for enclosing the grating and has a CTE of $\alpha_3$ and a length $L_3$. One end of the grating 11 is attached as by a bonding point 17 to the tube 16 in this example, and the other end is attached by a bonding point 18 the end of the other low CTE member 15. The low CTE member 15 at its other end is bonded (19) onto a high CTE member which, in turn, at its other end is bonded (20) onto the tube (16) thus completing the temperature-compensating package.

Since the rise in the temperature of the grating results in the increase of the Bragg wavelength $\lambda$ primarily due to the temperature-dependent increase in $n_{eff}$ it is necessary to reduce the grating periodicity $\Lambda$ to compensate the effect and make $\lambda$ temperature-independent. This is accomplished by pre-stressing the fiber grating, e.g., by tension, and then causing the tension in the grating to become essentially proportionally relaxed as the ambient temperature is increased (or causing the tension to be stronger as the temperature is lowered). For this purpose, the temperature compensating package needs to include a structure or a structural component the length of which contracts upon heating, i.e., with a net negative coefficient of thermal expansion (CTE). For typical silica-based optical fiber gratings with a germanium doped core, the extent of the required thermal contraction strain upon heating for maintaining the temperature-insensitive Bragg wavelength is about 900× $10^{-6}$ for a temperature change of 100° C., i.e., an effective CTE of about $-9 \times 10^{-6}$/° C.

In the FIG. 1 embodiment, the effective thermal contraction on heating is obtained by utilizing a differential negative CTE of two linear bodies (14,15) in a parallel configuration attached onto a third linear body 16 (which can be thought of as a substrate). These bodies can be round or rectangular rods, tubes, strips or any arbitrary shaped bars. Upon heating, the substrate 16 expands to the right, the high CTE component 14 expands to the left and the low CTE component 15 to the left. The overall effective CTE of the composite structure (or the CTE imposed on the fiber grating) between the position A and position B is calculated by a relationship of $\alpha_{overall} \cdot L_g\{(\alpha_2 L_2 + \alpha_3 L_3) - \alpha_1 L_1\}$. If the FIG. 1 structure is simplified by keeping the lengths of all the components the same ($L_1 = L_2 = L_3 = L_g$), then $\alpha_{overall} = \alpha_2 + \alpha_3 - \alpha_1$. In an even simpler case, one can use a zero expansion material such as Invar alloy as the substrate ($\alpha_3 \sim 0$), in which case the effective CTE $\alpha_{overall} = \alpha_2 - \alpha_1$, the differential CTE between the two components. For example, if Cu ($\alpha_1 = 16.5$ ppm) is the high CTE component and Nb ($\alpha_2 = 7.1$ ppm) is the low CTE member, $\alpha_{overall} = 7.1 - 16.5 = -9.4$ ppm. If a brass alloy ($\alpha_1 = 19.2$ ppm) is the high CTE component and Mo ($\alpha_2 = \alpha_3 5.1$ ppm) is the low CTE component and also the substrate, $\alpha_{overall} = 5.1 + 5.1 - 19.2 = -9.0$ ppm. Some examples of various materials combinations and the resultant overall CTEs are given in Table 1. The desired value of $\alpha_{overall}$ for the fiber grating can be obtained not only by the selection of suitable materials for the structure of FIG. 1 but also by controlling relative lengths of the high CTE body, low CTE body, substrate body and the fiber grating.

TABLE 1

Some examples of negative overall CTE obtained in the FIG. 1 structure.
($\alpha_{overall} = -\alpha_1 + \alpha_2 + \alpha_3$ for $L_1 = L_2 = L_3$)

| Component 1 ($\alpha_1$, ppm/° C.) | Component 2 ($\alpha_2$, ppm/° C.) | Component 3 ($\alpha_3$, ppm/° C.) | $\alpha_{overall}$ (ppm/° C.) |
|---|---|---|---|
| Al ($\alpha_1$ = 22.4) | Invar ($\alpha_2$ = 0.3) | Invar ($\alpha_3$ = 0.3) | −21.8 |
| Al—Cu (22.2) | W (4.6) | Invar (0.3) | −17.3 |
| Brass (19.5) | Mo (5.1) | Invar (0.3) | −14.1 |
| 304 Stainless St. (18.1) | Invar (0.3) | Mo (5.1) | −12.7 |
| Alumel (16.7) | Invar (0.3) | Ta (6.5) | −9.9 |
| Brass (19.5) | Mo (5.1) | Mo (5.1) | −9.3 |
| Monel (14.2) | W (4.6) | Invar (0.3) | −9.3 |
| Brass (19.5) | Hf (5.9) | W (4.6) | −9.0 |
| Al—Cu (22.2) | W (4.6) | Ti (8.5) | −9.1 |
| Co (12.5) | Invar (0.3) | Nb (7.1) | −5.1 |
| Nichrome (13.1) | W (4.6) | Ti (8.5) | 0 |
| Fe—52Ni (10.2) | Mo (5.1) | Mo (5.1) | 0 |
| Brass (19.5) | Al$_2$O$_3$ (9.2) | SiO$_2$ (0.7) | −9.6 |

It should be noted that the coefficient of thermal expansion of many metals and alloys can be altered as by texture formation, cold working, and variation in alloy composition by as much as a few to several per cent. The $\alpha_{overall}$ can be altered by 0–10% through changing the relative lengths ($L_1$, $L_2$ and $L_3$).

The advantages of the temperature-compensating package are that i) the length of the package can be compact, essentially as short as the length of the fiber grating itself, ii) the desired negative CTE value can be obtained by a wide choice of selection of various commercially available, low-cost metallic or non-metallic materials as well as by slightly altering the lengths of the device structure components, and iii) the bonding of most of the structural components can easily be accomplished by high-speed or low-cost processing such as spot welding, riveting, soldering or brazing.

Figure 2A:
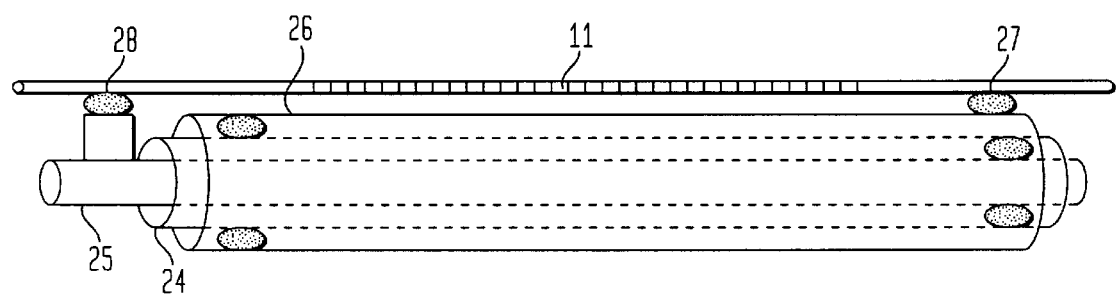
FIGS. 2A and 2B schematically describe alternative embodiments utilizing a (a) cylindrical or (b) channeled guiding configuration for thermal expansion/contraction.
Figure 2B:
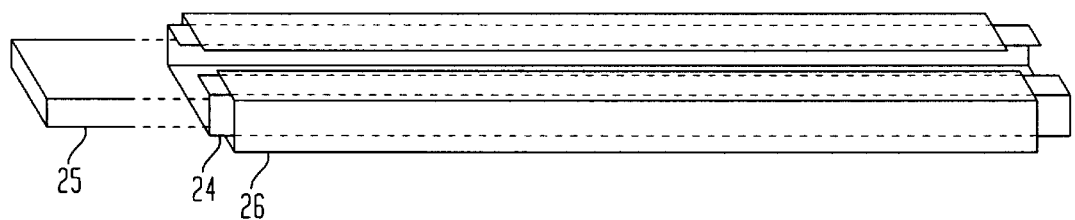

FIG. 2(a) illustrates an alternative embodiment utilizing a cylindrical configuration with the low CTE component in the core as a rod with the high CTE component and the low CTE substrate (housing) component as concentric tubes. The advantage of the tubular configuration of FIG. 2(a) is that the overall device dimension is more compact in thickness than that in FIG. 1. A similar arrangement of channeled members shown in FIG. 2b can be substituted for the tubular arrangement in FIG. 2a.

Figure 3A:
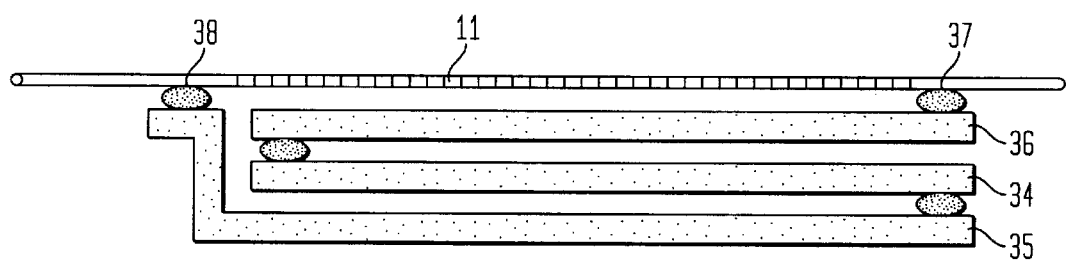
FIGS. 3(a)–(c) schematically illustrate other alternative embodiments.
Figure 3B:
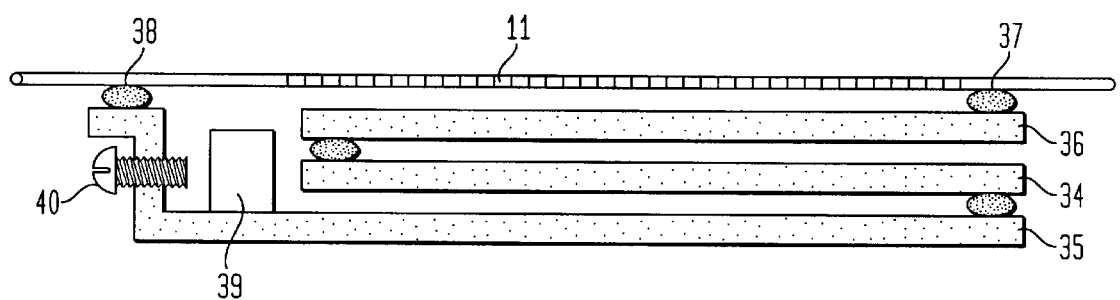
Figure 3C:
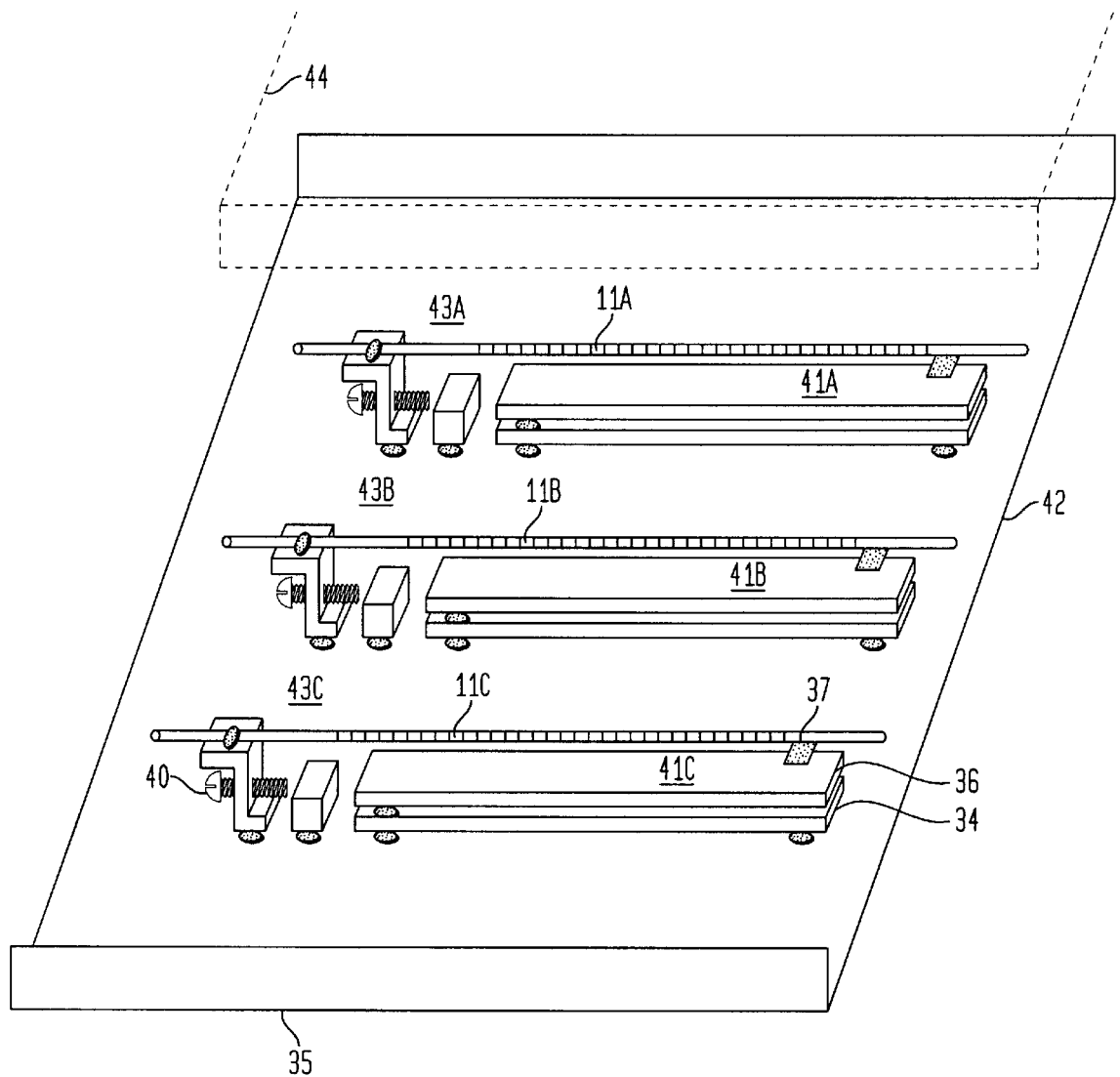

In FIGS. 3(a)–(c), other embodiments of the inventive device are illustrated. In FIG. 3(a), narrow strips of thermally expanding/contracting components (34, 35, 36) are placed together in a stacked configuration, with the high CTE component 34 in the middle. The temperature compensation occurs in the similar manner as for the embodiments described in FIGS. 1 and 2. The lower component 35 is bent up (e.g., by plastic bending operation, or by adding a small separate piece through spot welding, epoxying, soldering or brazing) in order to raise the height so that the optical fiber grating 11 is positioned horizontally above the upper component 36.

For reliable packaging of optical fiber gratings, it is important to have a capability to finely adjust ("tweak") the Bragg reflection wavelength (or the peak coupling wavelength in long-period gratings) after the packaging is nearly completed. This is because there is some grating-to-grating variation in the periodicity ($\Lambda$) and hence in the reflection wavelength, which needs to be corrected by finely adjusting the tensile strain applied to the fiber grating. In addition, some package-to-package variation in the amount of tensile strain applied during industrial assembly and packaging is unavoidable, which needs to be corrected as well. A typical amount of pre-strain on the fiber grating required in the temperature compensating package is in the range of $200$–$2000 \times 10^{-6}$, most typically about $500 \times 10^{-6}$. This is equivalent to about 0.001 inch elongation for a 2" long grating, and a 0.6–0.8 nm shift (increase) in the reflection wavelength for communication light wavelength of, e.g., 1550 nm. Since the optical fiber gratings are relatively expensive, a means for post-assembly correction and salvaging of the packaged grating is highly desirable. An additional need for fine adjustment is so that the required pre-strain on the grating can conveniently be applied after the assembly instead of maintaining a constant tensile stress (stretching) during the fiber bonding processes.

FIG. 3(b) shows a device including a mechanism for fine adjustment of the wavelength. In essence, the mechanism adjusts strain which, in turn, finely adjusts the wavelength. In the FIG. 3(b) embodiment, a solid stud 39, preferably made of relatively strong metal, alloy or ceramic, is firmly bonded to one of the thermally expanding/contracting components, in this particular case, onto the low CTE component 35. The bonding can be done preferably by spot welding, brazing, soldering. The use of epoxying, riveting or bolt-and-nut clamping is not excluded. In the bent-up portion of the lower component (left hand side in FIG. 3(b)), a threaded hole is drilled and a threaded screw 40 (preferably with a fine pitch threading for better movement control) is inserted and pushed against the fixed stud. As the threaded screw is turned further to an optimum position, the distance between the bent-up strip portion and the stud increases primarily by elastic bending of the bent-up strip. This in turn increases the tension on the fiber grating and the periodicity of refractive index perturbations resulting in the optimally corrected ("tweaked") reflection wavelength of the grating. The materials used for the "tweaker" device, the stud and the screw, are preferably chosen, for the sake of simplicity, to be the same material as the component onto which they are attached. However in principle, any materials can be employed for the screw or the stud as long as their CTE values and the thermal expansion/contraction behavior are taken into consideration. The wavelength adjusting scheme (tweakers) in the present invention is capable of straining the fiber grating by at least 0.0005 inch and shifting the wavelength by at least 0.5 nm with a wavelength tweaking resolution of at least 0.05 nm and preferably 0.01 nm or better. Instead of using the screw mechanism for the tweaker, other alternative configurations for altering the spacing between the bent-up portion and the stud can be utilized, for example, an insertable tapered wedge or replaceable spacer stacks.

For the purpose of reducing the packaging time and assembly cost, it is desirable if at least two and preferably several gratings are packaged together using a common substrate. The substrate can also serve, if desired, as one of the thermal expansion/contraction components. Such a multiple-grating package is schematically illustrated in FIG. 3(c). A plurality of the temperature-compensating components 41A, 41B, 41C are firmly bonded onto a common substrate 35 using, e.g., spot welding, brazing, soldering, epoxying or riveting. One end of each of the fiber gratings 11A, 11B, 11C is then bonded onto the top ledge of adjustment mechanisms 43A, 43B, 43C on the left and onto the components 41A, 41B, 41C at the right. The tweaker screw for each grating is then tightened to a desired extent, while monitoring the reflection wavelength of the fiber grating, so that the optimal wavelength and the optimal degree of pre-tension is obtained for each of the gratings. The top cover 44 for the packaging is then placed for protection of the gratings.

The advantages of the multiple-grating packaging illustrated in FIG. 3(c) include the possibility of high-speed assembly via i) the use of the open top configuration for easy assembly access, ii) the use of fast bonding technique such as spot welding or riveting, iii) the ability to bond the fiber grating without having to apply the accurate amount of required pre-tension during the bonding step (as the pre-tension in the present invention can be applied later by the tweaker), and iv) the use of the common substrate so that the number of the assembly steps and components are reduced. All these advantages are likely to lead to higher device yield and lower assembly cost.

Figure 4A:
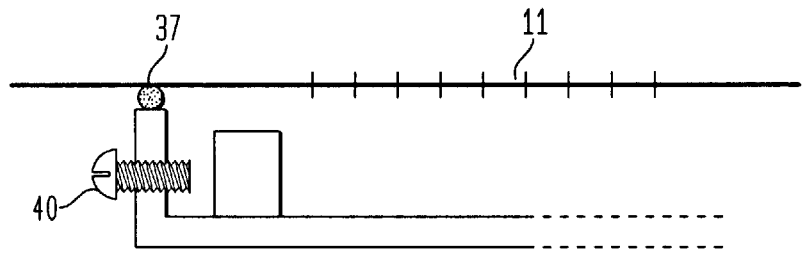
FIG. 4 illustrates strain adjustment mechanisms useful in the embodiments of FIGS. 1–3.
Figure 4B:
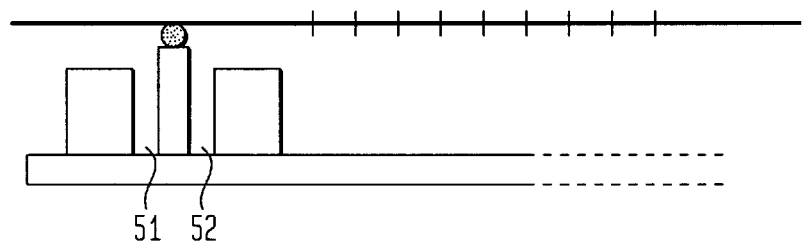
Figure 4C:
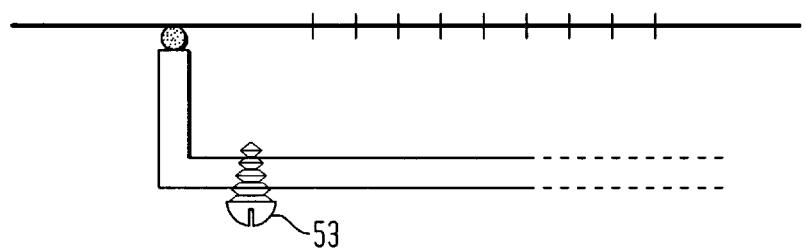
Figure 4D:
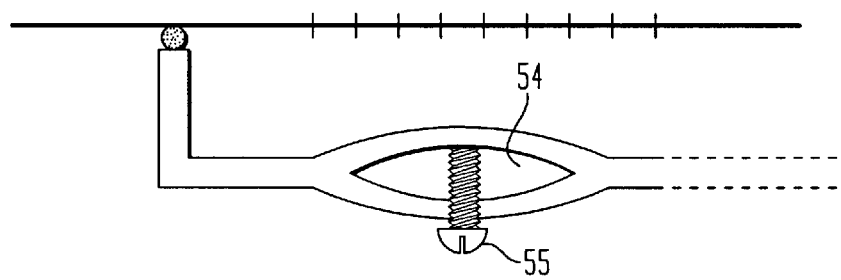
Figure 4E:
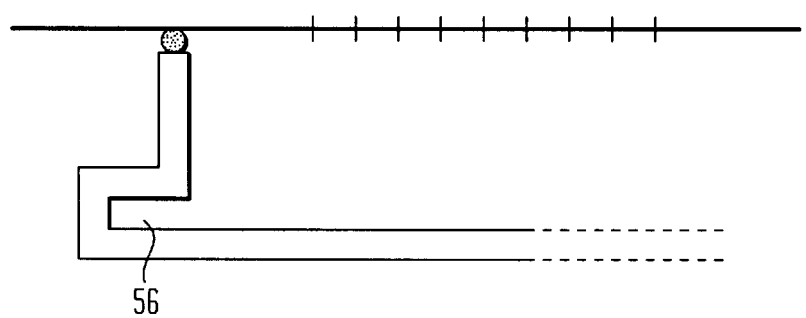

The adjustment mechanism can have various configurations such as shown in FIGS. 4(a)–(e). The FIG. 4(a) configuration is the one shown in FIG. 3(b) and (c). In the FIG. 4(b) configuration, tapered wedges or spacers (not shown) can be inserted to one of the two gaps 51, 52 (the left gap for reducing and right gap 52 for increasing the tension) to optimally adjust the tension on the fiber grating. In FIG. 4(c), a slot (not shown) (preferably an elongated slot) is machined out (or punched out) from one of the thermally expanding/contracting components, and a screw 53 is driven in or out of the slot to expand or contract it so that the component is elongated or shortened. In FIG. 4(d) a slit 54 is made or machined in a bonded metal layer and a bolt 55 (or screw) is inserted in position for separating the parts of the slitted layer so that the length of the components is elongated or shortened. In FIG. 4(e), one of the ends of the lower component is multiply bent to form an adjustable gap 56 and a screw or spacer (not shown) alters the gap and hence the tension on the fiber grating.

The advantage of the FIG. 4(e) mechanism is that the tweaker is a part of the same component and no other part is needed to be bonded onto it. In all of the tweaker configurations, the tweaking can alternatively be accomplished by permanent plastic strain instead of elastic strain.

For example, in FIGS. 4(b) or (e), a screw driver can be inserted into one of the gaps and twisted repeatedly until a permanent deformation of the right magnitude is obtained, and then the screw driver is withdrawn from the gap.

The invention can now be better understood by considering the following specific example.

EXAMPLE

Figure 5:
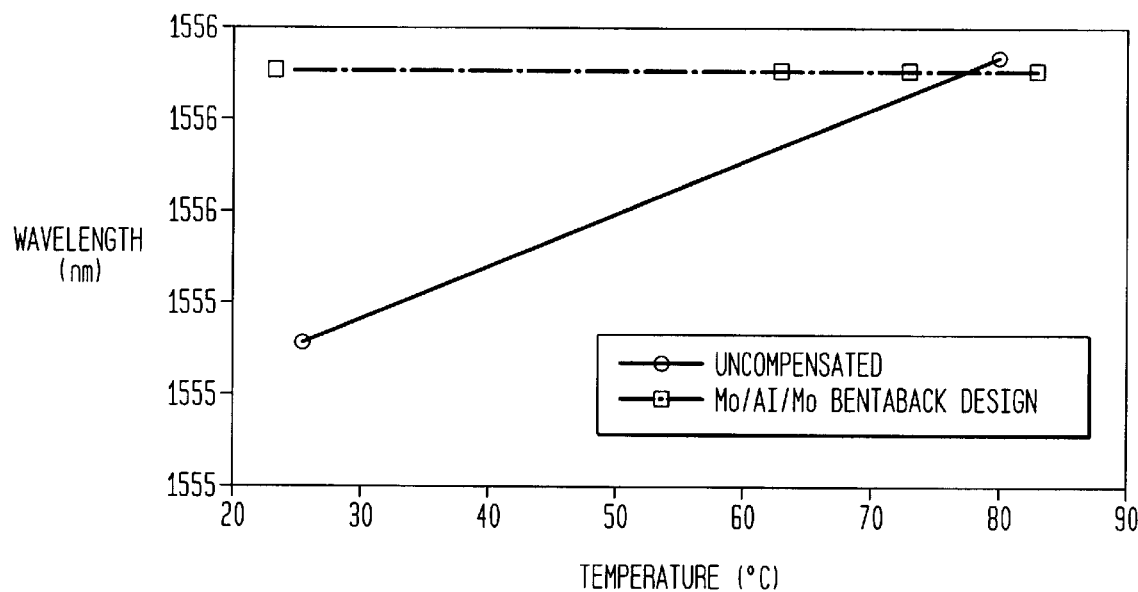
FIG. 5 is a graphical illustration showing temperature dependent change of the Bragg grating wavelength in (a) an uncompensated package and (b) a temperature-compensated package.

A temperature-compensating fiber grating package with the device FIG. 3(b) configuration was assembled as follows. The lower, low CTE component was made out of molybdenum strip with a CTE of ~5.1 ppm/° C. (about 0.25" wide and about 2.5" long). The left corner was bent up by about 0.125" tall. A threaded screw hole was machined on this portion before the bending-up. A molybdenum stud (~0.150" long) was spot welded to the lower component with a gap from the bent-up portion being about 0.080". A high CTE component, cold rolled aluminum with a CTE of about 22 ppm/° C. (about 0.25" width and 2" long) were epoxy bonded at 110° C. and cured for 20 minutes. A silica-based fiber grating with a Bragg reflection wavelength of λ=1555.05 nm was partially stripped of its protective polymer coating near the bonding spot and epoxy bonded as in FIG. 3(b). The tweaker screw made of brass (CTE ~19 ppm/° C.) was then tightened to the extent that a pre-strain of ~0.001" elongation in fiber length and a shift of wavelength by 0.90 nm to λ~1555.95 nm were obtained. The tweaked package was then subjected to heating while the stability of the wavelength in the package was being monitored using a spectrum analyzer. Shown in FIG. 5 are comparative curves of the Bragg wavelength λ vs temperature plot for the uncompensated and the temperature-compensated packages. It is evident from the figure that the temperature-compensating grating package exhibits the desirable characteristics of essentially temperature-insensitive wavelength properties with the λ vs T slope of about 0.0001 nm /° C.

Figure 6:
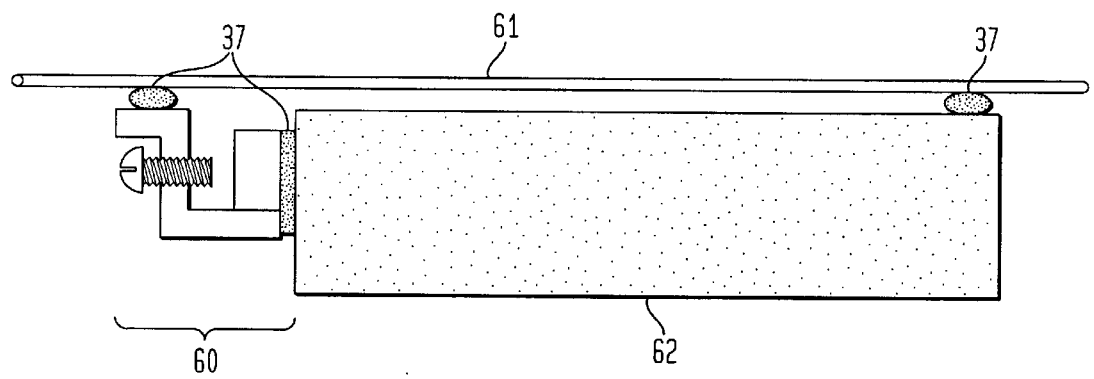
FIG. 6 schematically illustrates a strain adjustment mechanism useful in a variety of optical devices.

The concept of convenient wavelength adjustment described herein can be generalized to other types of optical device designs. In general, as shown in FIG. 6, a wavelength fine adjustment mechanism 60 can be coupled between any stretchable optical component 61 such as a sheet or fiber grating and an optical device 62 utilizing the stretchable component, such as a temperature compensated grating package. The adjustment mechanism adjusts the strain on the switchable component, thereby providing fine adjustment to the wavelength.

Thus, while the invention is described mostly in terms of Bragg gratings, the same approaches are equally applicable to the long period gratings or chirped gratings for the three purposes, i.e., i) temperature compensating, ii) prestraining after assembly of the gratings, and iii) fine wavelength readjustment (tweaking) for correctional purpose after shipping, installment or service of the relatively expensive, assembled fiber grating package and systems. Also, the concept of differential CTE can be utilized not only to create negative overall CTE but also positive overall CTE if needed.

It is to be understood that the above-described embodiments are illustrative of only a few of the many possible specific embodiments which can represent applications of the invention. Numerous and varied arrangements can be made by those skilled in the art without departing from the spirit and scope of the invention.

What is claimed:

1. A temperature-compensated optical fiber grating device comprising:

a longitudinally extending optical fiber grating; and three longitudinally extending packaging bodies, one said body having a coefficient of thermal expansion larger than the other two, said bodies mechanically attached to one another to form a composite structure having an effectively negative coefficient of thermal expansion between two points, and said grating attached between said two points, said device having a length in the longitudinal direction which is not more than 30% longer than the grating length and having a temperature-dependent wavelength change of less than 0.2 nm/100° C.

2. A device according to claim 1 wherein said optical fiber grating is a Bragg grating.

3. A device according to claim 1 wherein said optical fiber grating is a long period grating.

4. A device according to claim 1 wherein said optical fiber grating is a chirped grating.

5. A device according to claim 1 wherein said device has a length in the longitudinal direction which is not more than 10% longer than the grating length.

6. A device according to claim 1 having a temperature-dependent wavelength change of less than 0.05 nm/100° C.

7. A device according to claim 1 wherein at least one of said packaging bodies is a longitudinally extending hollow tube.

8. A device according to claim 7 wherein said tube surrounds said fiber grating.

9. A device according to claim 1 wherein at least one of said packaging bodies is a longitudinally extending channel member.

10. A device according to claim 1 further comprising a strain adjustment mechanism coupled to at least one of said packaging bodies for adjusting the wavelength of said device.

11. An optical fiber grating device comprising a plurality of temperature-compensated optical fiber grating devices according to claim 1 disposed on a common substrate.

12. A multiple temperature optical fiber grating device according to claim 11 further comprising a common cover member.

13. An optical device comprising a stretchable optical component, a device for stretching said optical component and, coupled between said component and said device for compensating temperature, an adjustment mechanism for adjusting the strain on said optical component.

14. A device according to claim 13 wherein said grating is a Bragg grating.

15. A device according to claim 13 wherein said grating is a long period grating.

16. A device according to claim 13 wherein said grating is a chirped grating.

* * * * *